United States Patent [19]
Hagimoto

[11] Patent Number: 5,925,867
[45] Date of Patent: Jul. 20, 1999

[54] OPTICAL DEVICE INCLUDING MULTIPLE REFLECTORS AND OPTICAL SYSTEMS FOR READING BAR CODES

[75] Inventor: Mitsuru Hagimoto, Tokyo, Japan

[73] Assignee: OKI Electric Industry Co., Ltd., Tokyo, Japan

[21] Appl. No.: 08/814,259

[22] Filed: Mar. 10, 1997

[30] Foreign Application Priority Data

Sep. 27, 1996 [JP] Japan .................................. 8-256084

[51] Int. Cl.[6] ................................................ G06K 7/10
[52] U.S. Cl. ............. 235/454; 235/462.45; 235/472.01; 235/457; 250/237 G; 250/208.6; 359/563; 359/572
[58] Field of Search .................................... 235/454, 462, 235/472, 461, 467, 470, 457, 462.43, 462.45, 472.01, 472.03; 250/235, 568, 237 G, 208.6; 359/2, 3, 17, 558, 562, 563, 566, 568, 572

[56] References Cited

U.S. PATENT DOCUMENTS

| | | | |
|---|---|---|---|
| 3,611,292 | 10/1971 | Brown et al. ..................... | 235/454 X |
| 3,753,249 | 8/1973 | Silverman ......................... | 235/457 X |
| 4,805,175 | 2/1989 | Knowles ........................... | 235/472 X |
| 4,999,482 | 3/1991 | Yang .................................. | 235/457 |
| 5,053,612 | 10/1991 | Pielemeier et al. ............... | 235/454 X |
| 5,151,581 | 9/1992 | Krichever et al. ................. | 235/467 |
| 5,350,909 | 9/1994 | Powell et al. ..................... | 235/472 |
| 5,449,892 | 9/1995 | Yamada ............................. | 235/472 X |
| 5,481,095 | 1/1996 | Mitsuda et al. ................... | 235/454 |
| 5,498,862 | 3/1996 | Edler ................................. | 235/457 |
| 5,572,007 | 11/1996 | Aragon et al. .................... | 235/472 |
| 5,600,116 | 2/1997 | Seo et al. .......................... | 235/454 X |

FOREIGN PATENT DOCUMENTS

| | | |
|---|---|---|
| 0 057 370 A2 | 8/1982 | European Pat. Off. . |
| 0 377 973 A2 | 7/1990 | European Pat. Off. . |
| 0 475 675 A2 | 3/1992 | European Pat. Off. . |
| 0 587 113 A2 | 3/1994 | European Pat. Off. . |
| 0 669 592 A1 | 8/1995 | European Pat. Off. . |
| 6-4702 | 1/1994 | Japan . |

Primary Examiner—Michael G. Lee

[57] ABSTRACT

An optical device reads the information such as bar codes on an object. A light-emitting element emits a read-beam. A lens cover has an inclined surface that is at an angle with the read-beam and reflects the read-beam toward a bar code, the read-beam emerging as a reflected-beam after reflection from the surface of the bar code. The reflected-beam contains a component directly reflected from the bar code and a component randomly reflected by the white and black areas of the bar code. An optical system in the form of a lens is arranged between the lens cover and the light-emitting element, and converges the read-beam to the bar code. The inclined surface is also at an angle with the reflected-beam and reflects the reflected-beam toward a second optical system in the form of a lens which in turn converges the reflected-beam emerging from the inclined surface to a light-sensing element. The light-sensing element detects the reflected-beam. The inclination angle of the inclined surface may be selected such that more randomly reflected light is contained in the reflected-beam than the directly reflected light.

5 Claims, 12 Drawing Sheets

DIRECT RELECTION

OPTICAL DEVICE INCLUDING MULTIPLE REFLECTORS AND OPTICAL SYSTEMS FOR READING BAR CODES

BACKGROUND OF THE INVENTION

1. Field of the Invention

This invention relates to optical devices such as photo-interrupters that are utilized for bar code reading and object detection.

2. Description of Related Art

Figures 23, 24:
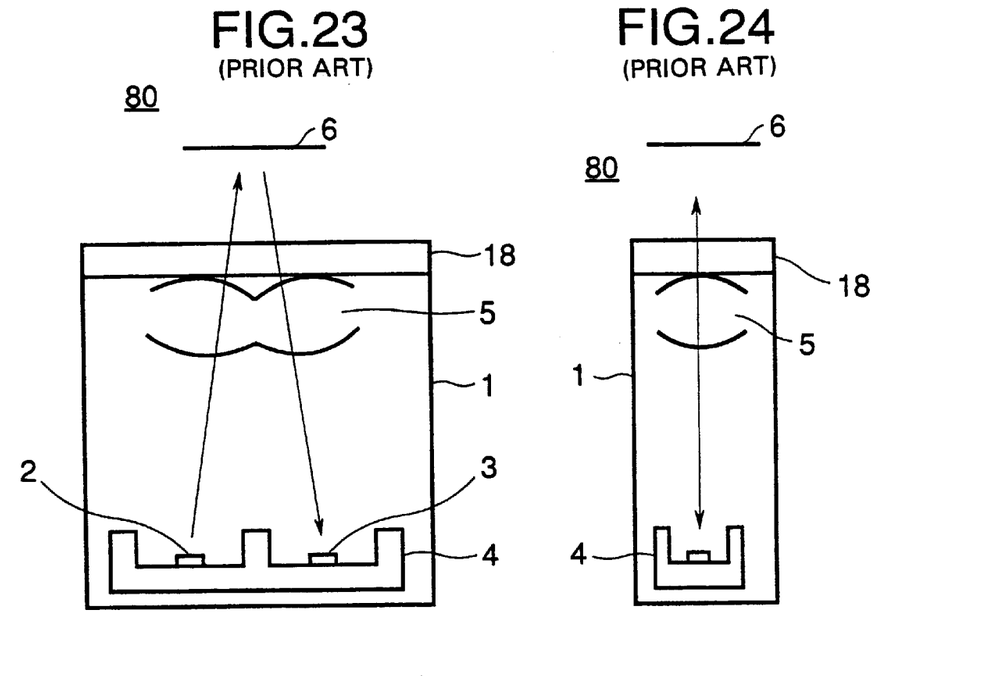
FIGS. 23 and 24 illustrate the construction of a conventional photo-interrupter.

FIGS. 23 and 24 show a conventional reflective-type photo-interrupter 80 equipped with a light-emitting unit and a light-sensing unit. The light-emitted from the light-emitting unit is reflected off an object surface and is then detected by the light-sensing unit. In this conventional photo-interrupter 80, light-emitting chip 2 and light-sensing chip 3 are mounted to a head 4 by some method such as gold wire bonding. This photo-interrupter is further provided with a lens 5 which focuses a read-beam emitted from light-emitting element 2 on the object surface and converges a reflected-beam from the object surface on the light-sensing element 3, and a case which houses various members of the unit and blocks ambient light from coming into the unit, and a lens cover 18 for protecting the lens 5.

When reading a bar code 6 using reflection-type photo-interrupter 80 of the aforementioned construction, the bar code 6 is moved above the reflective-type photo-interrupter 80, or the reflective-type photo-interrupter 80 is moved above bar code 6, thereby reading the bar code 6.

When the read-beam is converged to a certain spot on a white area of the bar code 6, the amount of the reflected-beam is large and therefore the light-sensing chip 3 receives a greater amount of light. This results in an increase in the photo-current generated by the light-sensing chip 3. Also, when the read-beam is focused at a certain spot on a black area of the bar code 6, the amount of the reflected-beam is small, resulting in a relative decrease in the photo-current generated by light-sensing chip 3. In this manner, the bar code pattern is converted into a varying photo-current generated by the light-sensing chip 3.

In order to realize a small sized photo-interrupter, the distance from the light-emitting chip 2 and light sensing chip 3 to the bar code 6 is preferably as short as possible.

The focal length of the lens 5 can be shortened by decreasing the radius of curvature of the lens 5, thereby decreasing the distance from the light-emitting chip 2 and light-sensing chip 3 to the bar code 6. However, the radii of curvature of the lens 5 smaller than a certain value cause larger aberrations of the lens 5, making it difficult to distinguish between the white and black areas as well as reducing the depth of focus. A reduced depth of focus makes it difficult to accurately read the bar codes when the bar codes are moving in the direction of the optical axis of the read-beam. Therefore, the distance from the light-emitting chip 2 and light sensing chip 3 to the bar code 6 cannot be shorter than a certain minimum value. This limitation prevents package reduction of an apparatus incorporating photo-interrupter 80.

Figure 25:
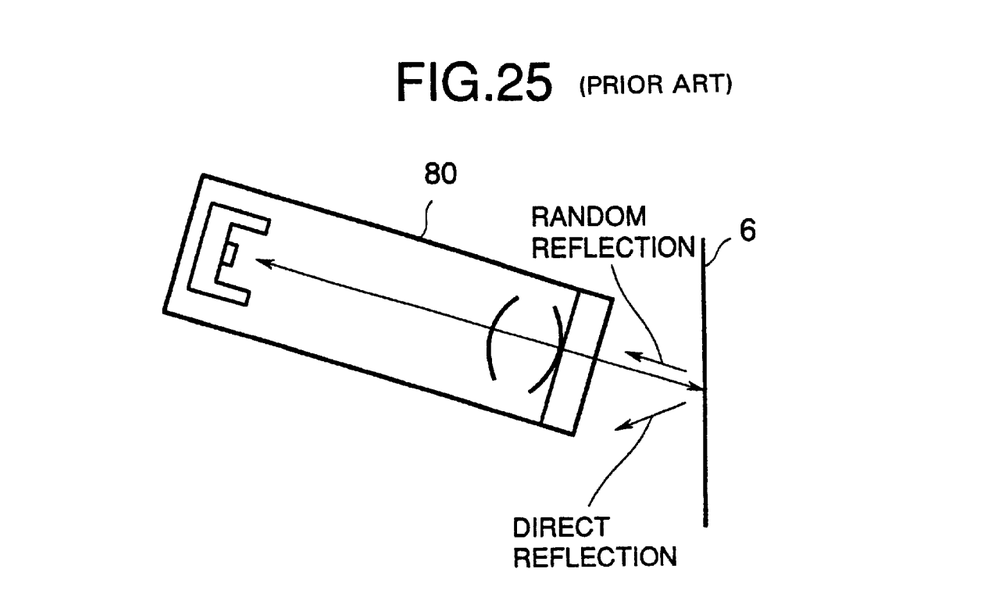
FIG. 25 illustrates the position of a conventional photo-interrupter relative to an object.

Also, for a reflection-type photo-interrupter such as the one shown in FIGS. 23 and 24, the light-emitter and light-sensor are placed in a mirror relation for ease of manufacture. With this construction, the light directly reflected (referred to as direct reflection hereinafter) from the bar codes enters directly the light-sensing chip. The intensity of the direct-reflection is more sensitive to the luster of the medium on which the bar code is printed than to the black and white areas of the bar code. Thus, the bar codes on a very lustrous object cannot be read properly. In order to accurately read such bar codes, the sensor is tilted relative to the bar code as shown in FIG. 25 so that the reflected-beam contains a lesser amount of direct-reflection with an increased ratio of scattered light to the direct-reflection.

However, a tilted photo-interrupter occupies a larger space within the housing of the interrupter, presenting a problem in assembling it into the apparatus. Thus, incorporating such a photo-interrupter in the apparatus is an obstacle to miniaturizing the apparatus.

SUMMARY OF THE INVENTION

The present invention was made in view of the problems noted above.

An object of the invention is to provide an optical device which lends itself to the miniaturization of apparatus.

Another object of the invention is to provide an optical device which ensures that for example bar codes are reliably read regardless of the luster of the surface of a medium on which the bar code is printed.

A light-emitting element emits a first beam of light or read-beam. A lens cover has an inclined surface that is at a an angle with the read-beam and reflects the read-beam toward a bar code, the read-beam emerging as a second beam of light or reflected-beam after reflection from the surface of the bar code. The reflected-beam contains components directly reflected from the bar code arid randomly reflected by the white and black areas of the bar code. An optical system in the form of a lens is arranged between the lens cover and the light-emitting element, and converges the read-beam to the bar code. The inclined surface is also at an angle with the reflected-beam and reflects the reflected-beam toward a second optical system in the form of a lens which in turn converges the reflected-beam emerging from the inclined surface to a light-sensing element. The light-sensing element sensing the reflected-beam.

The inclination angle of the inclined surface may be selected such that more randomly reflected light is contained in the reflected-beam than the directly reflected light.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

First Embodiment

Figure 1:
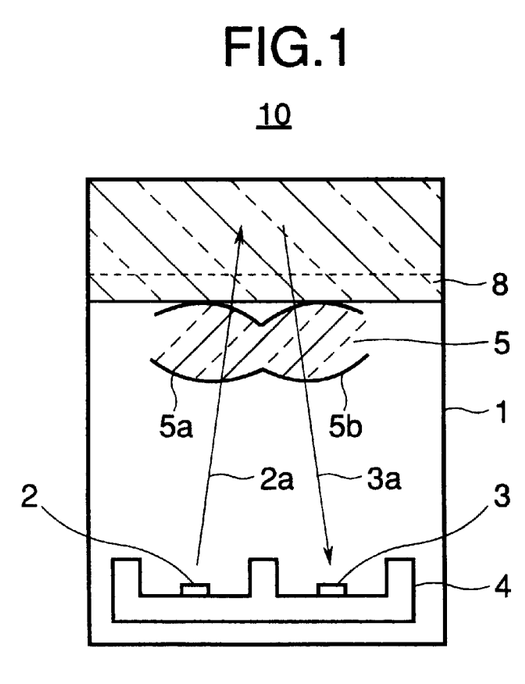
FIGS. 1 and 2 are sectional views showing the construction of the optical device related to first embodiment in this invention.
Figure 2:
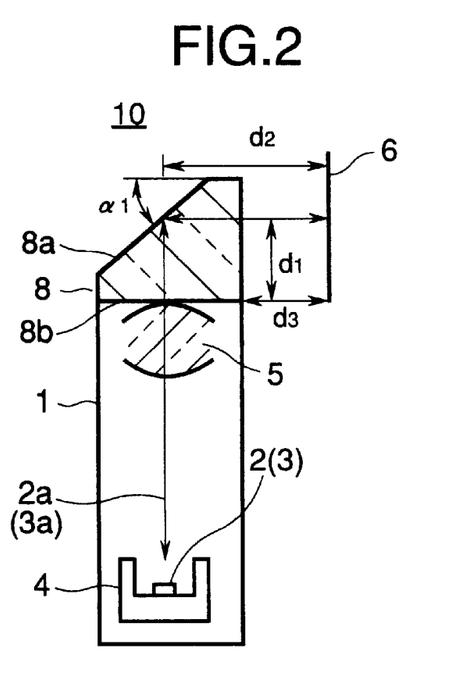

FIGS. 1 and 2 are sectional views of an optical device (photo-interrupter 10) according to a first embodiment of present invention.

Referring to FIGS. 1 and 2, a light-emitting chip 2 emits a read-beam, and a light-sensing chip 3 For sensing the read-beam reflected off the surface (herein referred to as "reflected-beam") of a bar code 6 as an object to be read. The bar code 6 includes white and black areas as shown. The light-emitting chips 2 and light-sensing chip 3 are mounted on a head 4. A lens 5 is held above the light-emitting chip 2 and light-sensing chip 3, and includes a lens section 5a and lens section 5b, the lens 5a focusing the read-beam from light-emitting chip 2 on the bar code 6 and the lens 5b focusing the reflected-beam on the light-sensing chip 3. A lens cover 8 is disposed on the lens 5. A case 1 houses the head 4, lens cover 8, and other associated components, not shown, therein.

The above two lens sections 5a and 5b have optical axes 2a and 3a, respectively, which are somewhat oblique to each other.

A lens cover 8 is made of a transparent material such as glass or resin, and has a surface 8a which is inclined at 45 degrees with respect to the plane PLo including the two optical axes 2a and 3a of the lens 5. The plane PLo is also substantially perpendicular to the surface of the bar code 6.

Figure 3:
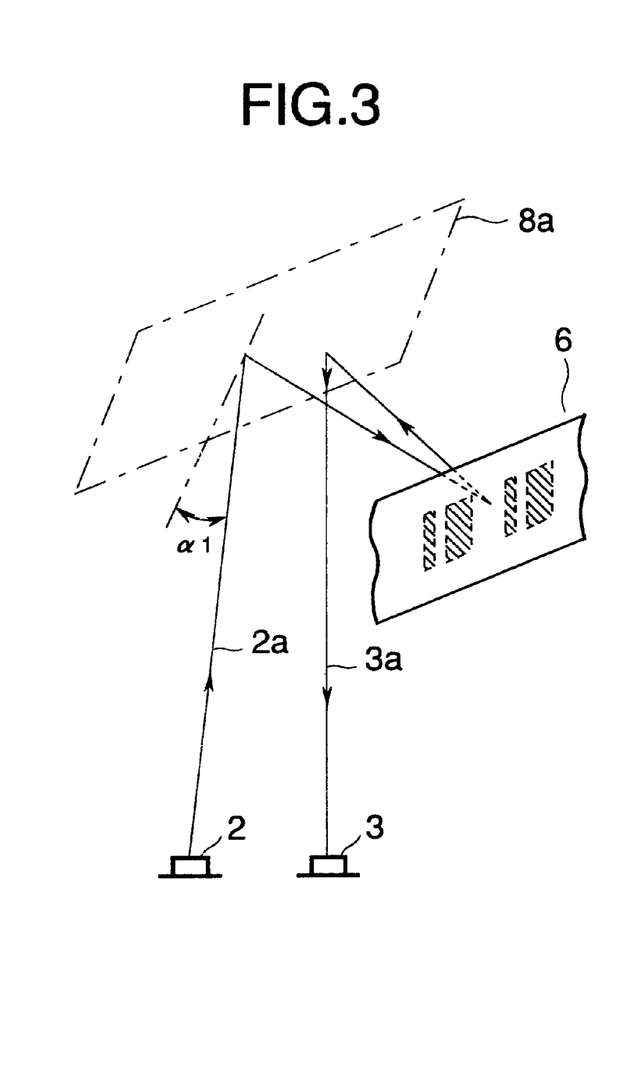
FIG. 3 is a perspective view illustrating the optical axes of the read-beam and reflected beams in the first embodiment.
Figure 4:
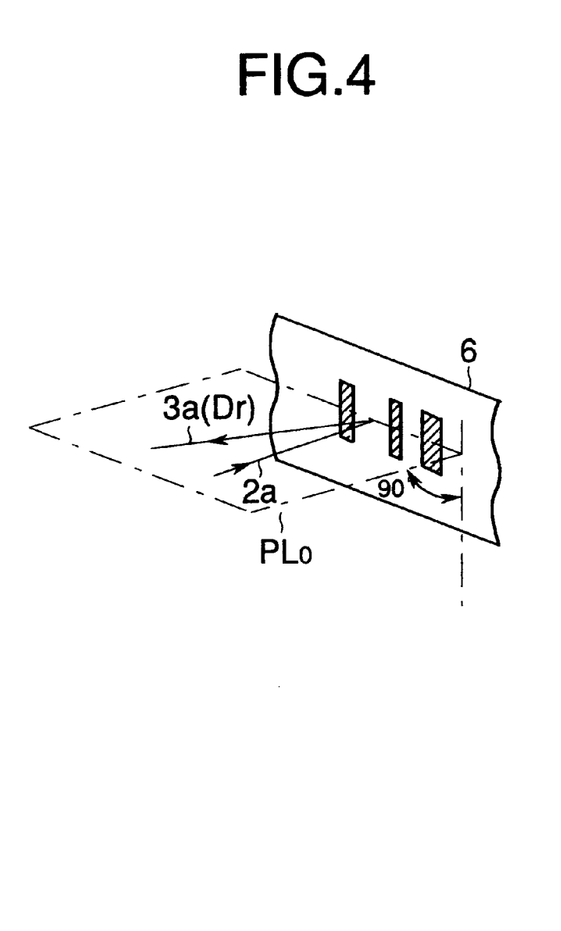
FIG. 4 is another perspective view of the first embodiment, illustrating the directions of the light incident on and reflected by the bar code.

FIG. 3 is a perspective view of the optical axes 2a and 2b of the read-beam and reflected beam, respectively. The read-beam emitted from light-emitting chip 2 is converged by the lens 5, and is then reflected by the inclined plane 8a of the lens cover 8 to the bar code 6. Since the inclination angle of the inclined surface 8a is 45 degrees, the read-beam and reflected-beam are in a plane substantially perpendicular to the surface of the bar code 6 as shown in FIG. 4. The reflected-beam contains diffused reflection (randomly reflected light) and direct reflection Dr, and travels in the optical path 3a back to the photo-interrupter 10. Then, the components representing the information on the bar code 6 are redirected by the inclined surface 8a of the lens cover 8 toward the lens section 5b which in turn focuses the light to the light-sensing chip 3. For instance, with a lens cover 8 having a refractive index N of 1.5, the light incident upon the inclined surface 8a is totally reflected if the angle of incidence, i.e., $\alpha 1$ is greater than 41.8 degrees.

Figure 5:
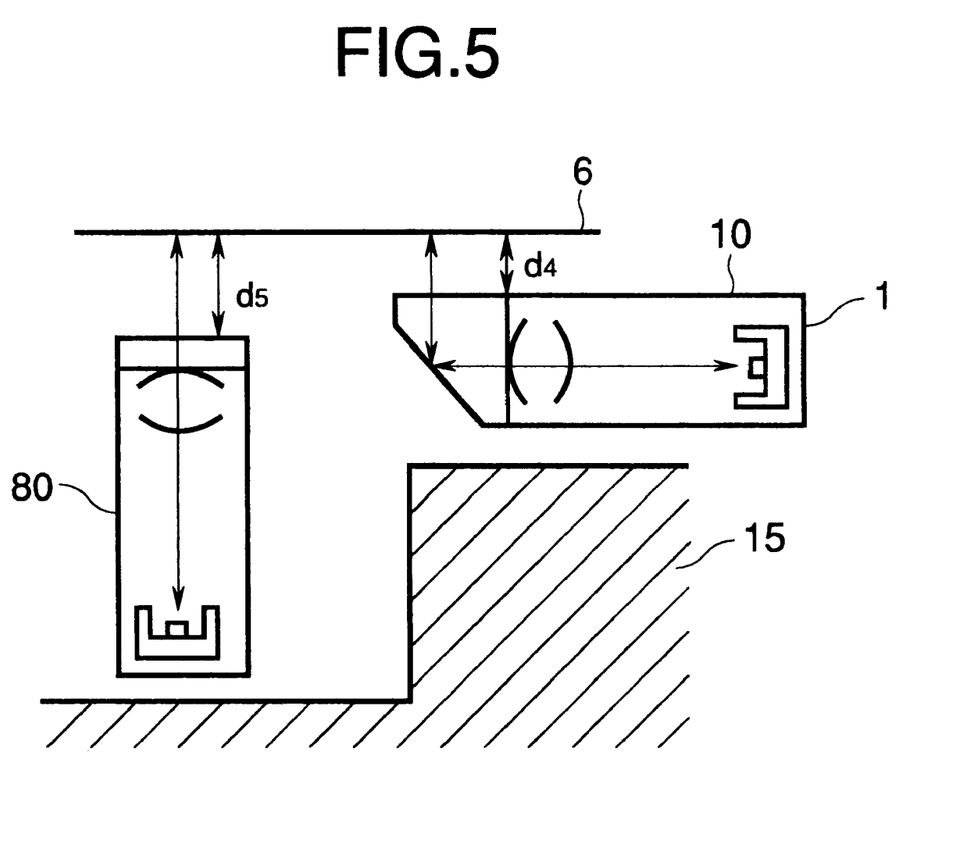
FIG. 5 compares a conventional optical device with an optical device according to the first embodiment, when assembled in an apparatus.

As shown in FIG. 2, the reflected-beam from the bar code 6 is redirected by the inclined surface 8a of the lens cover 8 by reflection. This construction offers a shorter distance d3 from the photo-interrupter 10 to the bar code 6 while still maintaining a sufficient optical distance d1+d2. Therefore, as shown in FIG. 5, when assembled in an apparatus, the construction of the first embodiment requires a distance d4 in the direction in which the read-beam illuminates the bar code 6, while the conventional construction requires a distance d5 longer than the distance d4. Thus, the construction of the first embodiment lends itself to the miniaturization of an apparatus into which the photo-interrupter 10 of this construction is installed. It is to be clearly understood that the photo-interrupter 10 of the embodiment takes a smaller space defined by a chassis 15 than the conventional photo-interrupter 80.

The use of the lens cover 8 of the aforementioned geometry not only protects the lens 5 but also functions the same way as a prism, and therefore eliminates the prism which was needed for redirecting the read-beam in the conventional apparatus. Therefore, equipping an apparatus with this type of photo-interrupter 10 allows cost reduction.

Second Embodiment

Figure 6:
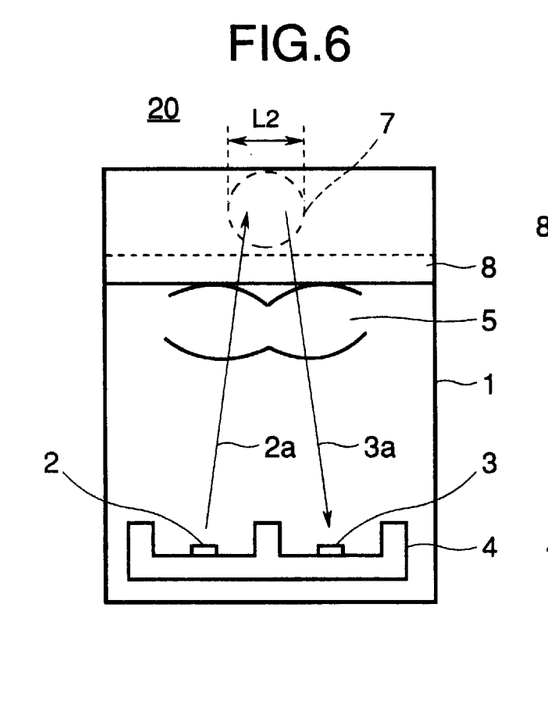
FIGS. 6 and 7 illustrate the construction of an optical device according to a second embodiment.
Figure 7:
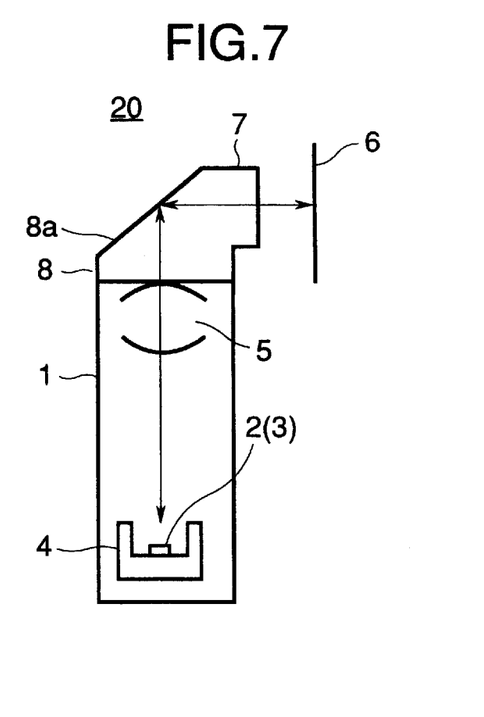

FIGS. 6 and 7 are sectional views of a photo-interrupter as an optical device according to a second embodiment. This embodiment applies to the photo-interrupter 20 just as the first embodiment described above. Structural elements in FIGS. 6 and 7 similar to or corresponding to those in FIGS. 1 and 2 have been given the same reference numerals.

Referring to FIG. 6, a head 4 supports a light-emitting chip 2 and a light-sensing chip 3. A lens 5 is held above the light-emitting chip 2 and light-sensing chip. A lens cover 8 is held on the lens 5. A case 1 houses the head 4 having the chips 2 and 3 mounted thereon, lens 5, and other associated components, not shown therein.

Figure 9:
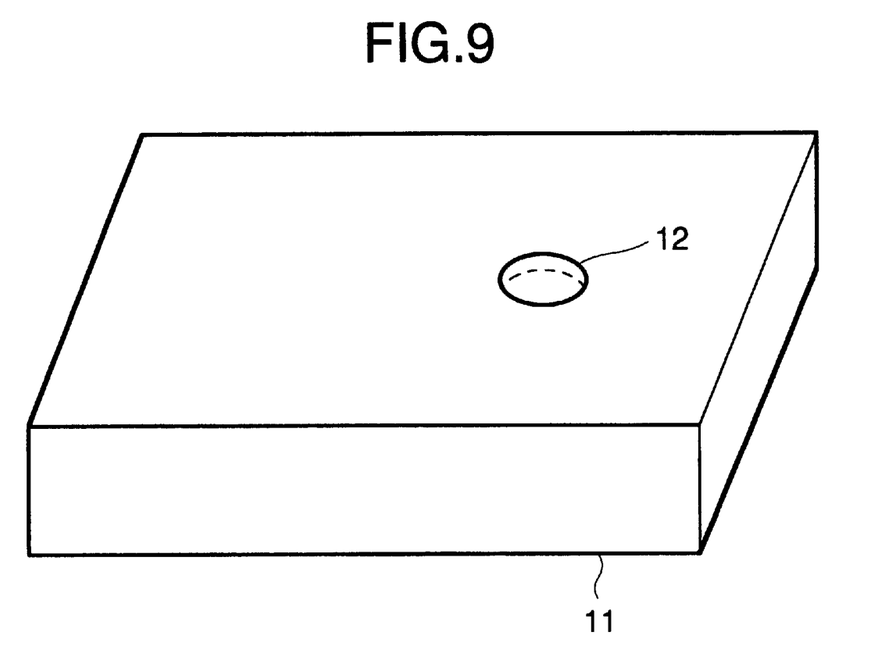
FIG. 9 illustrates a chassis to which the optical device of the second embodiment is assembled.

The photo-interrupter 20 has a mounting projection 7 by which the photo-interrupter 20 is positioned in place when the photo-interrupter 20 is assembled to a chassis 11 of an apparatus as shown in FIG. 9. The chassis 11 is not transparent to light, preventing ambient light from entering the apparatus. The mounting projection 7 is on the surface of the photo-interrupter 20 opposing the bar code 6.

Figure 8:
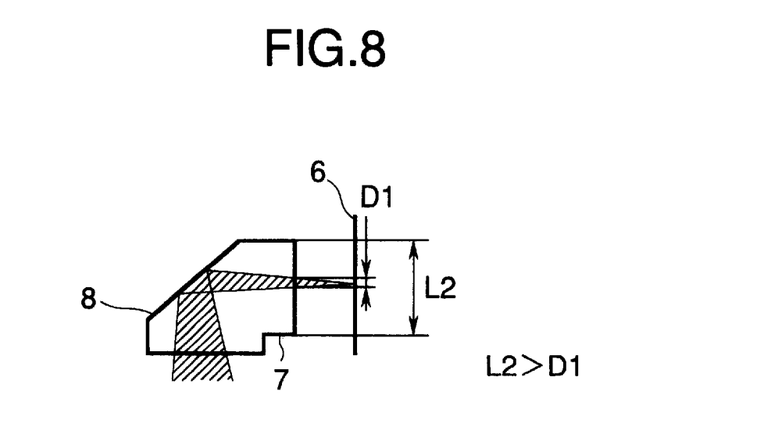
FIG. 8 illustrates the detail of the mounting projection of the optical device of the second embodiment.

The mounting projection 7 is a cylinder of a transparent material. As shown in FIG. 8, the diameter L2 of the mounting projection should be large enough so as not to block the read-beam having a diameter D1 when the read-beam emerges the mounting projection 7. The shaded area represents the divergence of light. Also, the diameter L2 is selected to be as Large as the components of the reflected-beam that would fall on the light-sensing element 3 are not blocked. If the interior surface is highly reflective, the diameter should be as small as possible so that only the light converged by the lens 5 enters the light-emitting chip.

The chassis 11 of an apparatus into which the photo-interrupter 20 is formed with a mounting hole 12 therein.

Figure 10:
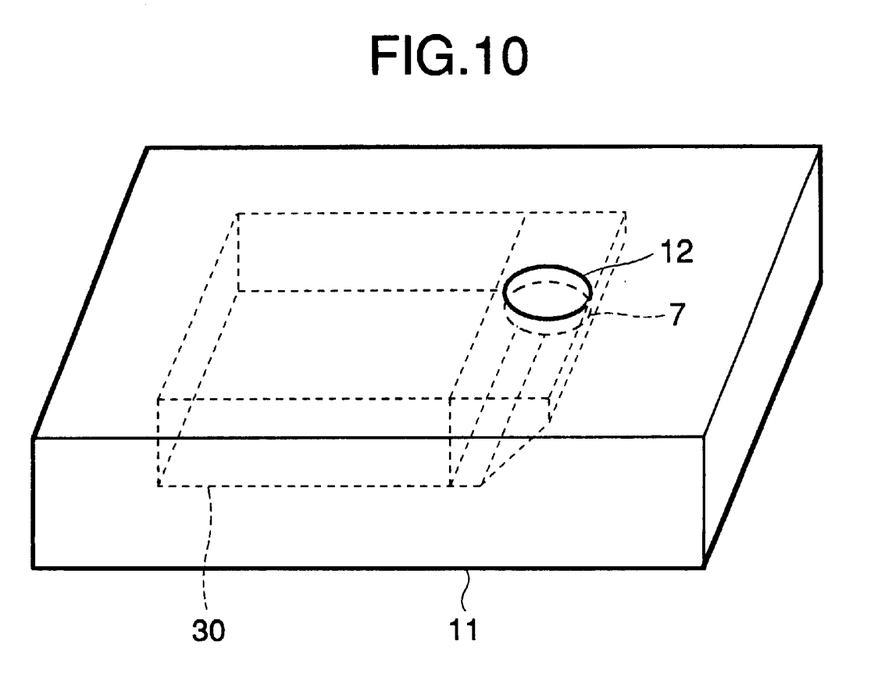
FIG. 10 is a perspective view of the optical device of the second embodiment when assembled to the chassis in FIG. 9.

To connect the chassis 11 to the photo-interrupter 20, the mounting projection 7 is inserted into the mounting hole 12, as shown in FIG. 10. When the diameter of the mounting hole 12 is such that the mounting projection 7 snugly fits thereinto, the photo-interrupter 20 is firmly connected to block 11. Such a diameter facilitates the assembly operation of the photo-interrupter 20.

On the other hand, if the diameter of hole 12 allows for some play, the position of the photo-interrupter 20 can be easily adjusted after insertion of the mounting projection 7, in which case the photo-interrupter 20 is fixedly assembled to the chassis 11 by a suitable method such as bonding by an adhesive, melting, or holding with the other structural elements of the chassis 11.

The photo-interrupter 20 is assembled to the chassis 11 with the mounting projection 7 which also functions as the optical path for the read-beam and reflected-beam.

The read-beam emerging the photo-inlterrupter 20 is more accurately positioned relative to the chassis 11 when the photo-interrupter 20 is positioned with reference to the mounting projection 7 than with reference to other part, e.g., near the head 4, of the photo-interrupter 20. The use of mounting projection as a positional reference minimizes variations in optical characteristics.

Figure 11:
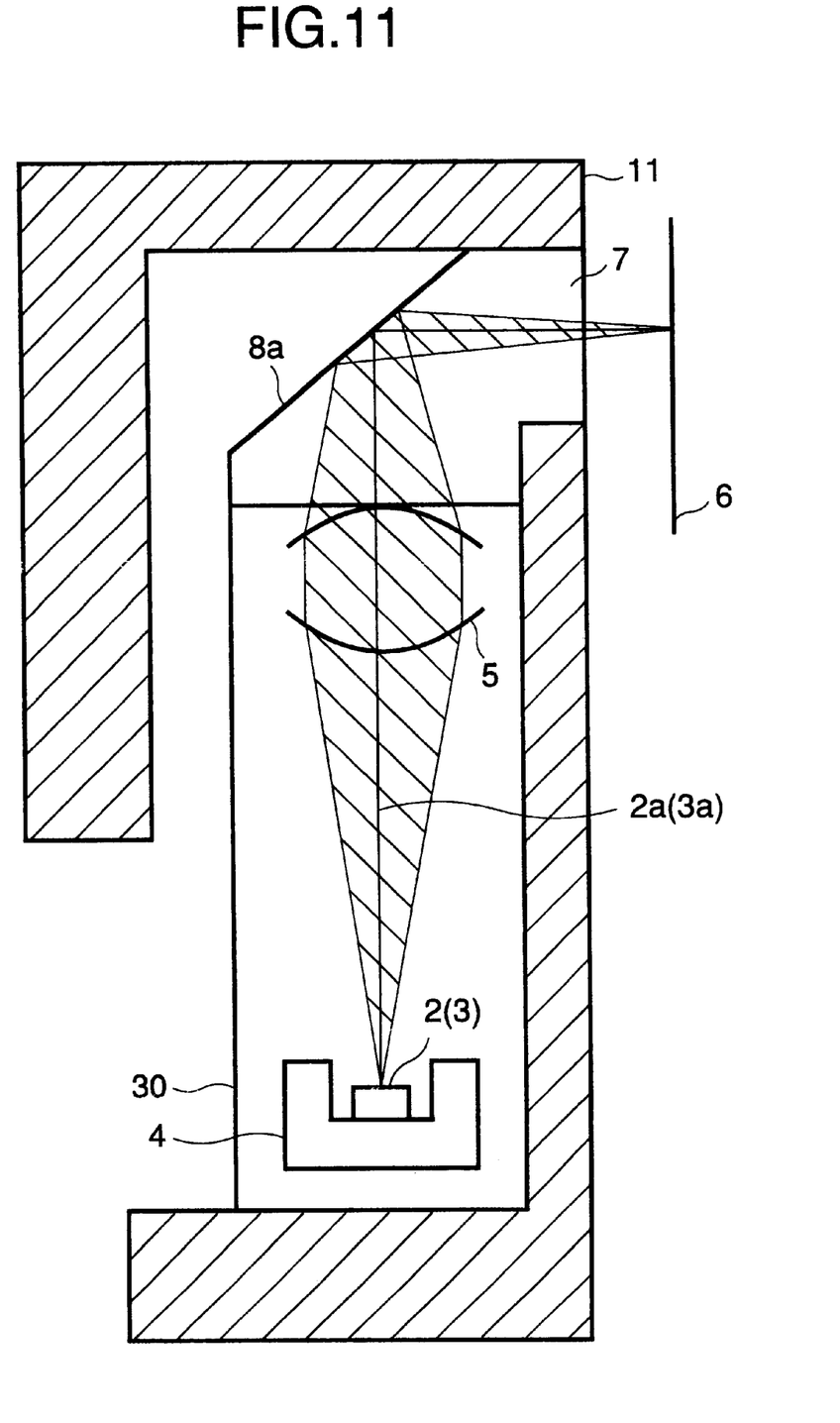
FIG. 11 is a cross sectional view showing the photo-interrupter of the second embodiment assembled in the chassis of FIG. 9.

FIG. 11 is a cross-sectional side view of the apparatus into which the photo-interrupter 20 is assembled. Referring to FIG. 11, the read-beam and reflected-beam are output and input, respectively, through the mounting projection 7 which serves as a positional reference when the photo-interrupter 20 is assembled to the chassis 11. Therefore, even if the position of the rest of the photo-interrupter 30 changes slightly relative to chassis 11, the focus position of photo-interrupter 30 relative to the chassis 11 will not shift.

While the second embodiment has been described with reference to the mounting projection 7 in the form of a cylinder, the mounting projection may be other shapes in which case the shape of the hole 12 is in accordance with the shape of the mounting projection 7. In addition, rotation of the photo-interrupter, if not desired, can be prevented by forming the mounting projection 7 in the form of, for example, a prism.

Third Embodiment

If the inclination angle of the incline surface 8a of the first embodiment is set at 45 degrees, the read-beam travels in the plane substantially perpendicular to the surface of the bar code 6 as shown in FIG. 4 and the direct reflection travels back together with diffused reflection in the same plane entering the lens cover 8. The direct reflection may reach the light-sensing element 3. The third embodiment solves this problem.

Figure 12:
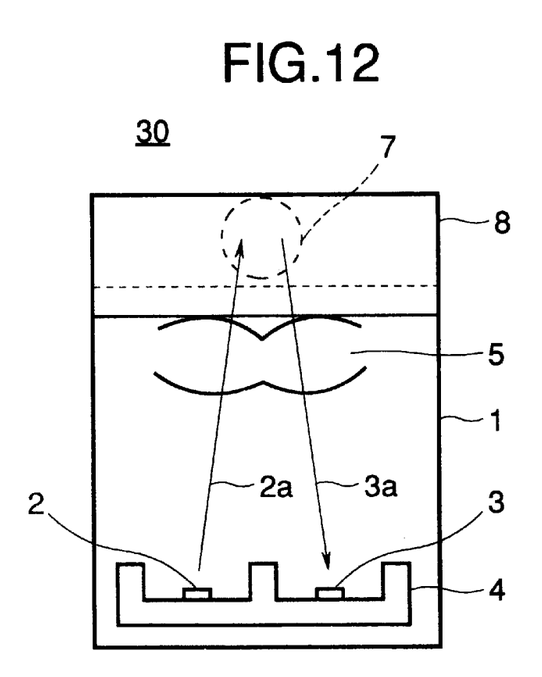
FIGS. 12 and 13 illustrate an optical device according to a third embodiment.
Figure 13:
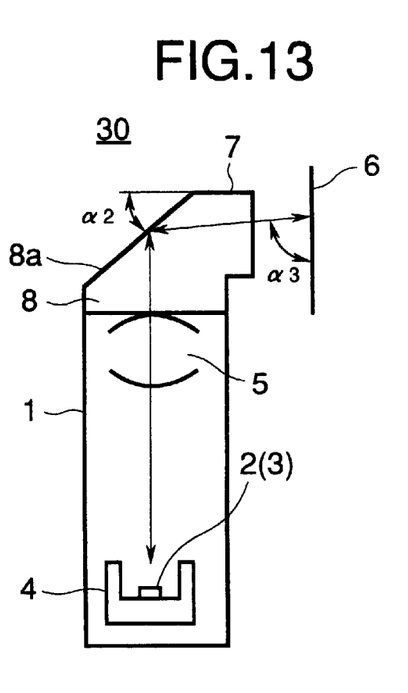

FIGS. 12 and 13 are sectional views of an optical device according to a third embodiment of the present invention. Components in FIGS. 12 and 13 corresponding to those in FIGS. 1, 2, 6, and 7 have been given the same or similar reference numerals.

Referring to FIG. 12, a head 4 supports a light-emitting chip 2 and a light-sensing chip 3 thereon. A lens 5 is held above the light-emitting chip 2 and light-sensing chip. A case 1 houses the lens 5, head 4, and other associated components, not shown. A lens cover 8 is held on the lens 5 and has a mounting projection 7 formed therewith. The mounting projection 7 is on the surface of the photo-interrupter 30 opposing the bar code 6.

The inclined surface 8a of the lens cover 8 of the photo-interrupter 30 shown in FIG. 13 is at angles $\alpha 2$ other than 45 degrees, e.g., 55 degrees, with the plane including the two optical axes 2a and 3a, as opposed to the inclined surface 8a of the photo-interrupter 20 shown in FIGS. 6 and 7 which is at an angle $\alpha 1$ at 45 degrees with the plane including the two optical axes. It is to be noted that this angle $\alpha 2$ is such that a significant amount of direct reflection will not enter the mounting projection 7.

Figure 14:
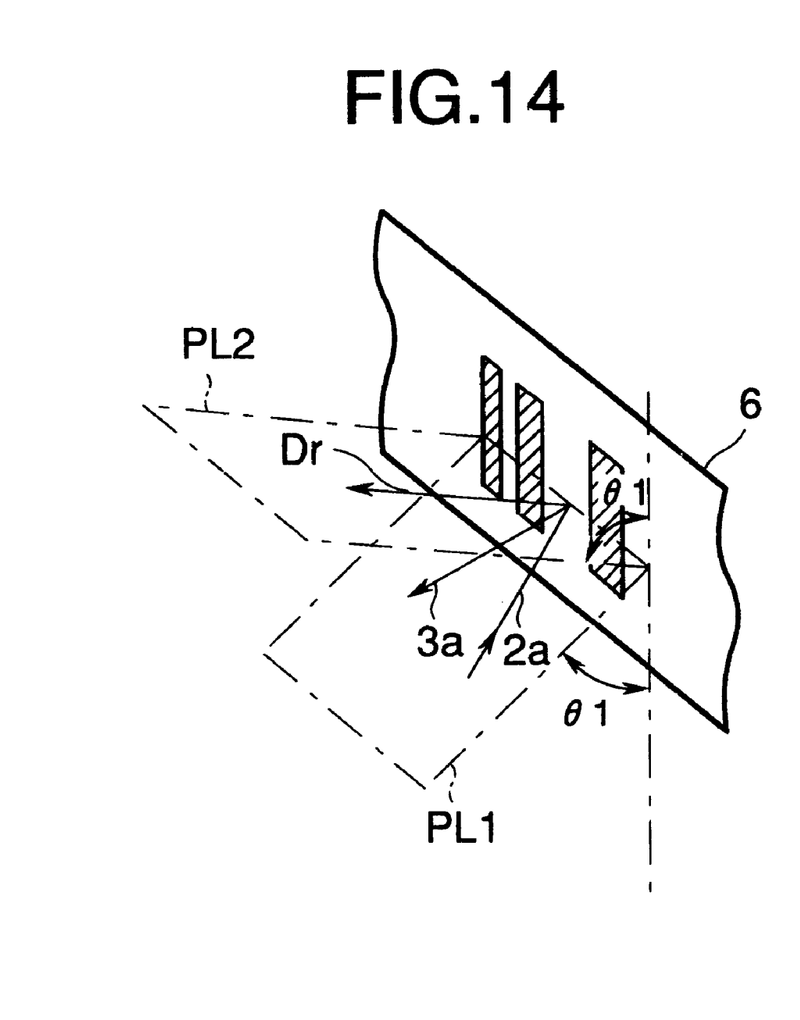
FIGS. 14 and 15 are perspective views of the third embodiment, illustrating the directions of the light incident on and reflected by the bar code.
Figure 16:
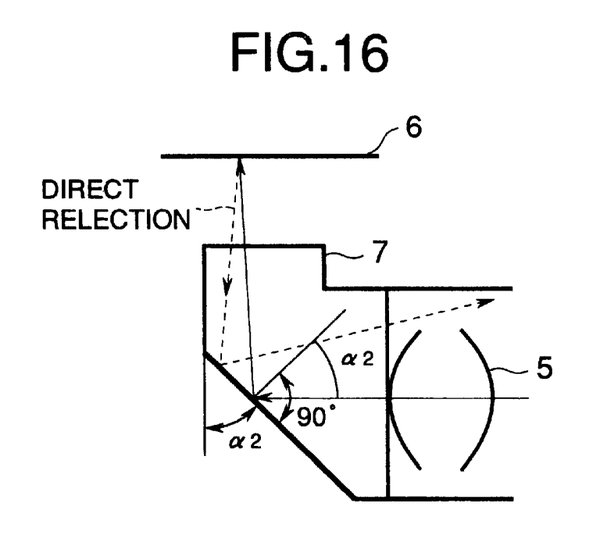
FIG. 16 illustrates the operation of the lens cover of the third embodiment.

If the angle $\alpha 2$ is larger than 45 degrees, the read-beam travels along the optical axis 2a in a plane PL1 in FIG. 14 and the diffused reflection travels along the optical axis 3a in the plane PL1 while the direct reflection travels along an optical axis Dr in a plane PL2. The planes PL1 and PL2 make an angle $\theta 1$ with the surface of the bar code 6. As shown in FIG. 16, the reflected-beam shown in solid line enters the mounting projection 7 and is converged by the lens 5 to the light-sensing element 3. Some of the direct reflection shown in dotted line enters the mounting projection 7 but is not converged by the lens 5 to the light-sensing element 3. Thus, the direct reflection will not reach the light-sensing element 3.

Figure 15:
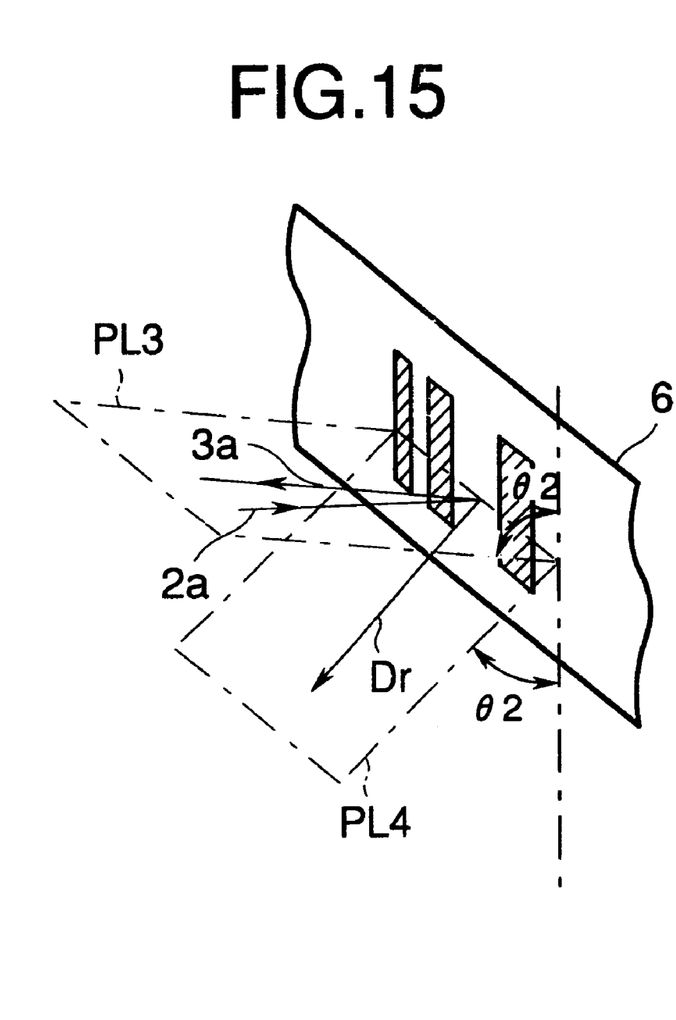

If the angle $\alpha 2$ is smaller than 45 degrees, the read-beam travels along the optical axis 2a in a plane PL3 in FIG. 15 and the diffused reflection is reflected back along the optical axis 3a in the plane PL3 into the mounting projection 7 while the direct reflection travels along an optical axis Dr in a plane PL4. The planes PL3 and PL4 make an angle $\theta 2$ with the surface of the bar code 6. Here again, some of the direct reflection enters the mounting projection 7 but is riot converged by the lens 5 to the light-sensing element 3. Thus, the direct reflection will not reach the light-sensing element 3. The angles $\theta 1$ and $\theta 2$ are shown somewhat larger than actual values in order to clearly illustrate the planes in which the light incident upon the bar code 6 and light reflected by the bar code 6 travel.

The angle $\alpha 2$ varies depending on the diameter of the mounting projection 7 and the distance from the mounting projection 7 to the bar code 6.

As described above, a large portion of the direct reflection is directed in a direction different from the direction in which the scattered light directed to the light-sensing element. Thus, the light incident upon the light-sensing element 3 contains the direct reflection and scattered light in different proportion with greatly increased ratio of the scattered light to the direct reflection.

The intensity of direct reflection is high but varies depending not only on the black and white surfaces of the bar code but also on the luster of the object on which the bar code is printed. For example, if the area concerned is black and the surface is glossy, the intensity becomes high making it difficult to distinguish between the black and white surfaces. On the other hand, the intensity of the diffused reflection is low, but is not affected significantly by the luster of the surface. Therefore, if the ratio of the scattered light to the direct reflection is increased, the overall intensity of the light incident upon the light-sensing element 3 decreases but becomes less sensitive to the luster of an object to be measured. The signal-to-noise ratio of the light incident upon the light-sensing element 3 can therefore be increased.

If the inclination angle $\alpha 2$ of the surface 8a is increased or decreased from 45 degrees, the percentage of the direct reflection in the reflected-beam can be reduced. As mentioned above, if the refraction index of the lens cover 8 is, for example, 1.5 and the incidence angle (i.e. inclination angle) is 41.8 degrees or more, the read-beam is totally reflected. Therefore, the inclination angle α2 can be set between 48.1 degrees and 45 degrees. The inclination angles α2 other than 45° cause the read-beam to be incident on the bar code at an angle α3 other than 90°, causing the light directly reflected by the lustrous surface of the bar code 6 to travel in such directions as riot to enter the mounting projection 7. However, if the surface of the bar code 6 is not substantially parallel to the plane including the optical axes of the lens 5, a significant amount of direct reflection may travel back in the plane including the read-beam. Thus, it is desirable that the inclination angle α2 be 45 degrees or larger.

An inclination angle of the surface 8a other than 45 degrees increases the ratio of the scattered light contained in the light reflected by the bar code 6, and therefore improves the signal-to-noise ratio of the light incident upon the light-sensing element 3. The inclination angle of the surface 8a greater than 45 degrees ensures that the light is totally reflected, so that no part of light passes through the surface 8a to the outside of the photo-interrupter.

Fourth Embodiment

Figure 17:
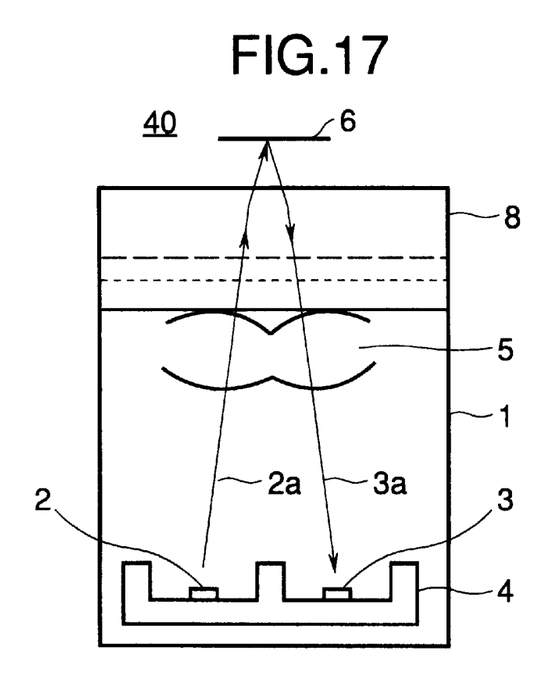
FIGS. 17 and 18 illustrate the construction of an optical device according to a fourth embodiment.
Figure 18:
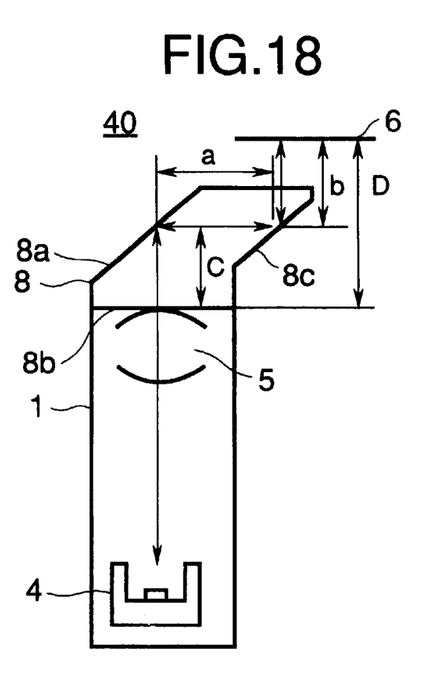

FIGS. 17 and 18 are sectional views of an optical device according to a fourth embodiment. Structural elements in FIGS. 17 and 18 similar to or corresponding to those in FIGS. 1, 2, 6, 7, 14 and 15 have been given the same reference numerals.

FIGS. 17 and 18 illustrate a photo-interrupter 40 of the fourth embodiment. Referring to FIG. 17, a head 4 supports a light emitting chip 2 and light sensing chip 3 thereon. Over the light emitting chip 2 and light sensing chip 3 is held a lens 5. A lens cover 8 is mounted on the lens 5. A case 1 houses the head 4, light emitting chip 2 and light sensing chip 3, lens 5, lens cover 8, and other associated components, not shown.

The lens cover 8 has two inclined surfaces 8a and 8c, substantially parallel to each other.

Referring back to FIG. 1, the optical distance from the bar code 6 to the bottom surface 8b of the lens cover 8 in contact with the lens 5 is d1+d2. In FIG. 18, the optical distance from the bar code 6 to the bottom surface 8b is a+b+c. However, the use of two surfaces 8a and 8c makes the physical distance D, from the bar code 6 to the bottom surface 8b, shorter by the distance a while stilt maintaining the optical distance a+b+c. The distance a can be determined at will by adjusting the space between two inclined surfaces 8a and 8c. Therefore, these two surfaces 8a and 8c may be advantageously used in reducing the overall size of an apparatus which incorporates the photo-interrupter 40.

Figure 19:
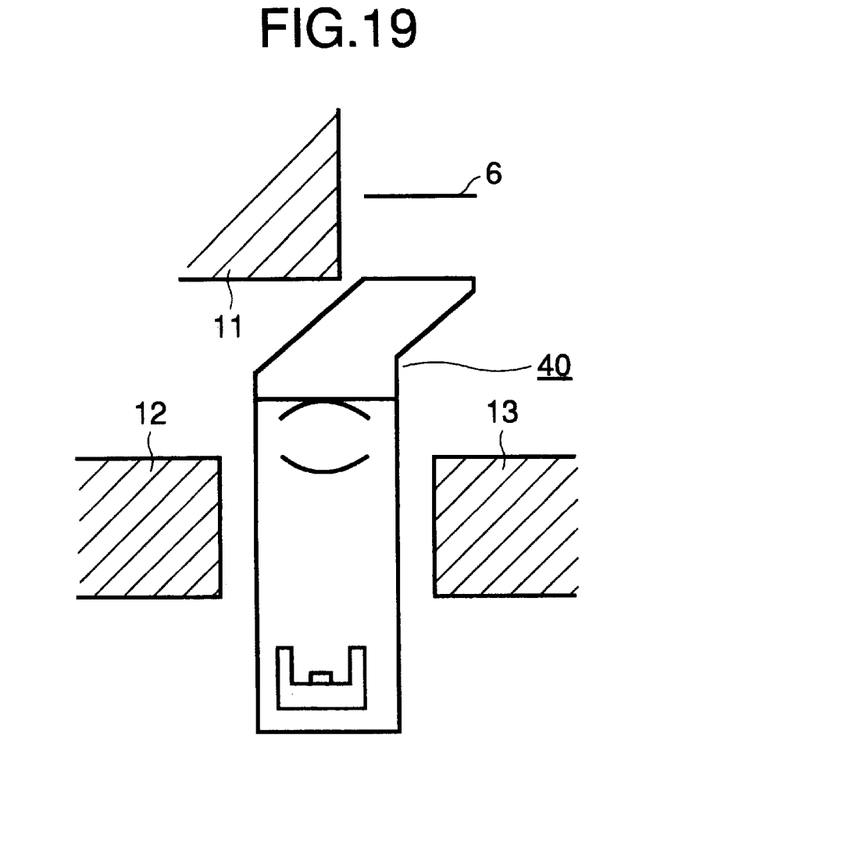
FIG. 19 illustrates the optical device according to the fourth embodiment.

If the mounting space of the photo-interrupter 40 is limited by obstacles 11–13 in the apparatus as shown in FIG. 19 into which the photo-interruipter 50 is incorporated, then the aforementioned two surfaces 8a and 8c provide a detour of light, increasing degrees of freedom in designing the apparatus. The shorter physical distance D resulting from the two surfaces 8a and 8b is an advantage to miniaturizing the apparatus.

Fifth Embodiment

The first to fourth embodiments have been described with reference to a reflection type photo-interrupter to which the present invention is applied.

Figure 20:
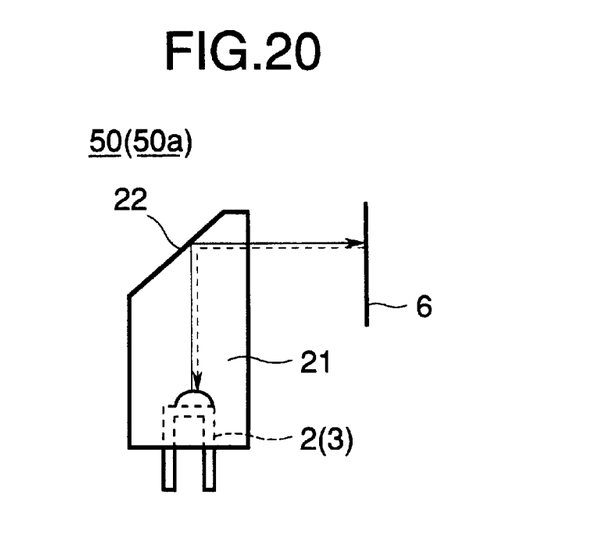
FIG. 20 illustrates the construction of the optical device according to a fifth embodiment.

A fifth embodiment is directed to the construction of a light-emitting element 50 and a light-sensing element 50a as shown in FIG. 20.

FIG. 20 illustrates the light-emitting element 50. The light-emitting element 50 and the light-sensing element 50a are of much the same construction and differ only in that the light emitting chip 2 and a light-sensing element 3 are interchanged. The solid lines indicate the light emitted by the light-sensing element 50 and the dotted lines indicate the light coming in the light light-sensing element 50a.

The light-emitting element 50 includes a light emitting chip 2 and a package 21 which is made of a transparent resin and houses tight emitting chip 2 therein. The package 21 includes an inclined surface 22 which functions as a reflecting surface in the same way as the inclined surface 8a formed, for example, on the lens cover 8 shown in FIG. 1.

The light-sensing element 50a includes a light sensing chip 3 in place of the light emitting chip 3 in the light-emitting element 50.

The surface 22 formed on a part of the package 21 for the light-emitting element 50 and the light-sensing element 50a offers more degrees of freedom of the arrangement thereof. Therefore, an apparatus incorporating the light-emitting element 50 and/or the light-sensing element 50a can realize package reduction.

Sixth Embodiment

Figure 21:
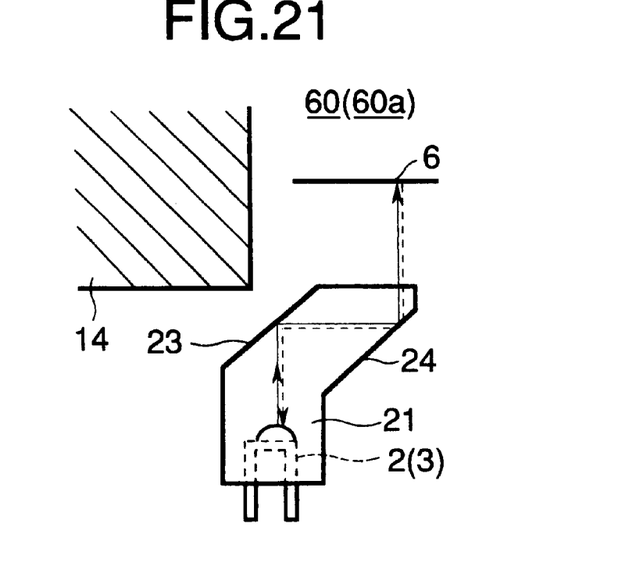
FIG. 21 illustrates the construction of the optical device according to a sixth embodiment.

A sixth embodiment is directed to the construction of a light-emitting element and a light-sensing element which have two inclined reflecting surfaces. FIG. 21 illustrates a light-emitting element 60 and a light-sensing element 60a according to the sixth embodiment. The solid lines indicate the light emitted by the light-sensing element 60 and the dotted lines indicate the light coming in the light light-sensing element 60a. The light-emitting element 60 and the light-sensing element 60a are of much the same construction and differ only in that the light emitting chip 2 and a light-sensing element 3 are interchanged.

This light-emitting element 60 includes a package 21 in the form of, for example, a transparent resin in which a light-emitting chip 2 is molded. The package has two inclined surfaces that function as a reflecting surface similar to the surfaces 8a and 8c in the fourth embodiment (FIG. 18).

The light-sensing element 60a has the light sensing chip 3 in place of the light sensing chip 3 in the light-emitting element 60.

If the mounting space of the light-emitting element 60 or the light-sensing element 60a is limited by obstacles in the apparatus in which the elements 60 or 60a is incorporated, then the two surfaces 23 and 24 provide a detour of light so that the obstacle 14 is cleared. The construction increases degrees of freedom in designing the apparatus. The package 21 having the two inclined surfaces 23 and 24 is an advantage to miniaturizing the apparatus into which the light-emitting element 60 arid/or the light-sensing element 60a is incorporated.

Seventh Embodiment

Figure 22:
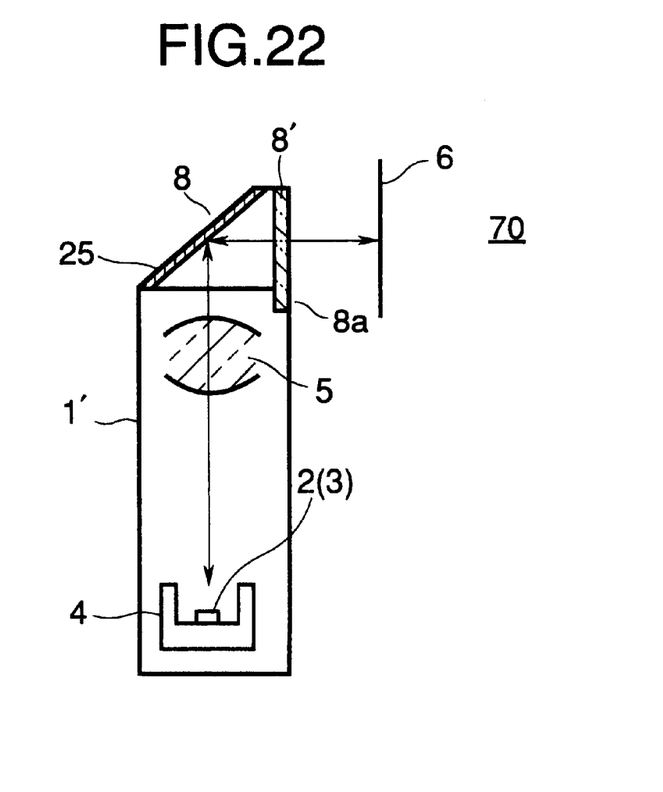
FIG. 22 illustrates the construction of the optical device according to a seventh embodiment.

FIG. 22 illustrates a photo-interrupter 70 according to a seventh embodiment. The seventh embodiment includes a reflecting mirror 25 in place of the inclined surface 8a of the aforementioned first to fourth embodiments.

Referring to FIG. 22, a head 4 supports a light-emitting element 2 and light-sensing element 3 thereon. A lens 5 is held over the head 4 and has two sections as in the first embodiment, only one being shown in the figure. One of the two sections has an optical axis in line with the optical axis of the read-beam and the other has an optical axis in line with the optical axis of the scattered light incident on the light-sensing element 3.

A case 1' has an inclined wall on its top and a mirror 25 placed on the interior side of the inclined wall. The case 1' also has an opening 8d covered by a lens cover 8' through which the read-beam emitted from the light-emitting element 2 emerges and the reflected-beam enters.

The mirror 25 reflects the read-beam converged by the lens 5 to direct the read-beam to the bar code 6. The mirror 25 also directs the reflected-beam from the surface of the bar code 6 to the lens 5 which in turn converges the light to light-sensing chip 3.

The photo-interrupter 70 is advantageous in that a small sized apparatus incorporating the photo-interrupter 99 is manufactured at lower costs.

Setting the angle of the inclined surface of the case 1' to other than 45 degrees improves the proportion of direct reflection and scattered light contained in the reflected-beam with increased ratio of scattered light to the direct reflection, increasing the signal-to-noise ratio of the reflected-beam.

While the first to seventh embodiments have been described with reference to the bar code 6, the invention also applies to objects, for example, a label having letter printing.

What is claimed is:

1. An optical device comprising:
    a light-emitting element mounted on a head to emit a first beam of light toward an object;
    a light-sensing element mounted on the head to sense a second beam of light, the second beam of light being the first beam of light reflected by a surface of the object;
    a first optical system positioned to converge the first beam of light;
    a second optical system positioned to converge the second beam of light substantially to the light-sensing element;
    a housing in which the light emitting element, the light sensing element, and the first and second optical systems are accommodated;
    a cover disposed on the housing, the cover having an inclined surface which reflects the first beam of light toward the surface of the object and reflects the second beam of light toward the light-sensing element via the second optical system; and
    wherein said light-sensing element has a reflector for reflecting the second beam of light to change its direction of travel.

2. The optical device of claim 1, wherein said reflector is parallel with said cover, and said second beam of light is reflected by said reflector and subsequently by said cover.

3. An optical device comprising:
    a light-emitting element mounted on a head to emit a first beam of light toward an object;
    a light-sensing element mounted on the head to sense a second beam of light, the second beam of light being the first beam of light reflected by a surface of the object;
    a first optical system positioned to converge the first beam of light;
    a second optical system positioned to converge the second beam of light substantially to the light-sensing element;
    a housing in which the light emitting element, the light sensing element, and the first and second optical systems are accommodated;
    a cover disposed on the housing, the cover having an inclined surface which reflects the first beam of light toward the surface of the object and reflects the second beam of light toward the light-sensing element via the second optical system; and
    wherein said light-emitting element has a reflector for reflecting the first beam of light to change its direction of travel.

4. The optical device of claim 3, wherein said reflector is parallel with said cover, said first beam of light is reflected by said cover and subsequently by said reflector.

5. An optical device comprising:
    a light-emitting element mounted on a head to emit a first beam of light toward an object;
    a light-sensing element mounted on the head to sense a second beam of light, the second beam of light being the first beam of light reflected by a surface of the object;
    a first optical system positioned to converge the first beam of light;
    a second optical system positioned to converge the second beam of light substantially to the light-sensing element;
    a housing in which the light emitting element, the light sensing element, and the first and second optical systems are accommodated;
    a cover disposed on the housing, the cover having an inclined surface which reflects the first beam of light toward the surface of the object and reflects the second beam of light toward the light-sensing element via the second optical system; and
    wherein said inclined surface is a mirror.

* * * * *